US010866405B2

(12) United States Patent
Stephenson

(10) Patent No.: US 10,866,405 B2
(45) Date of Patent: Dec. 15, 2020

(54) SHUTTER FOR LASER MODULATION

(71) Applicant: IDEX Health & Science LLC—Delaware, Rochester, NY (US)

(72) Inventor: Stanley W. Stephenson, Spencerport, NY (US)

(73) Assignee: IDEX Health & Science, LLC, Rochester, NY (US)

( * ) Notice: Subject to any disclaimer, the term of this patent is extended or adjusted under 35 U.S.C. 154(b) by 392 days.

(21) Appl. No.: 15/992,455

(22) Filed: May 30, 2018

(65) Prior Publication Data

US 2019/0369385 A1 Dec. 5, 2019

(51) Int. Cl.
*G02B 26/04* (2006.01)
(52) U.S. Cl.
CPC .................................... *G02B 26/04* (2013.01)
(58) Field of Classification Search
None
See application file for complete search history.

(56) References Cited

U.S. PATENT DOCUMENTS

| 4,286,856 | A | * | 9/1981 | McGrath | G03B 9/46 396/335 |
| 4,332,450 | A | | 6/1982 | Griffith | |
| 4,946,256 | A | | 8/1990 | Woodruff | |
| 5,313,239 | A | * | 5/1994 | Mizukawa | G03B 9/10 396/471 |
| 5,691,583 | A | | 11/1997 | Suzuki et al. | |
| 6,046,519 | A | | 4/2000 | Hanazumi et al. | |
| 8,827,500 | B2 | | 9/2014 | Stegelmann et al. | |
| 8,851,768 | B1 | | 10/2014 | Stephenson | |
| 9,281,733 | B2 | | 3/2016 | Stephenson | |
| 9,851,553 | B1 | * | 12/2017 | Stephenson | G01J 1/00 |
| 2011/0085145 | A1 | * | 4/2011 | Hayashi | G03B 33/12 353/38 |
| 2013/0201409 | A1 | * | 8/2013 | Yuzawa | G03B 9/08 348/744 |
| 2013/0258176 | A1 | * | 10/2013 | Jang | G03B 9/10 348/367 |
| 2014/0300944 | A1 | * | 10/2014 | Stephenson | G03B 9/10 359/230 |
| 2019/0369385 | A1 | * | 12/2019 | Stephenson | B23K 26/00 |

* cited by examiner

*Primary Examiner* — William B Perkey
(74) *Attorney, Agent, or Firm* — Louis S. Horvath

(57) ABSTRACT

An optical shutter apparatus for controllably blocking an aperture, the shutter apparatus having a rotary actuator configured to rotate a shaft about an axis from a closed-shutter angular position toward an open-shutter angular position and a shutter blade coupled to the shaft and extending along a plane that is in parallel with the axis of rotation, wherein a surface of the shutter blade is reflective. There is a ferromagnetic collar coupled to the shaft and having a protruding portion extending orthogonally from the shaft with respect to the axis. A stationary magnet is disposed to attract the protruding portion of the collar and urge the shaft toward the closed-shutter angular position.

17 Claims, 9 Drawing Sheets

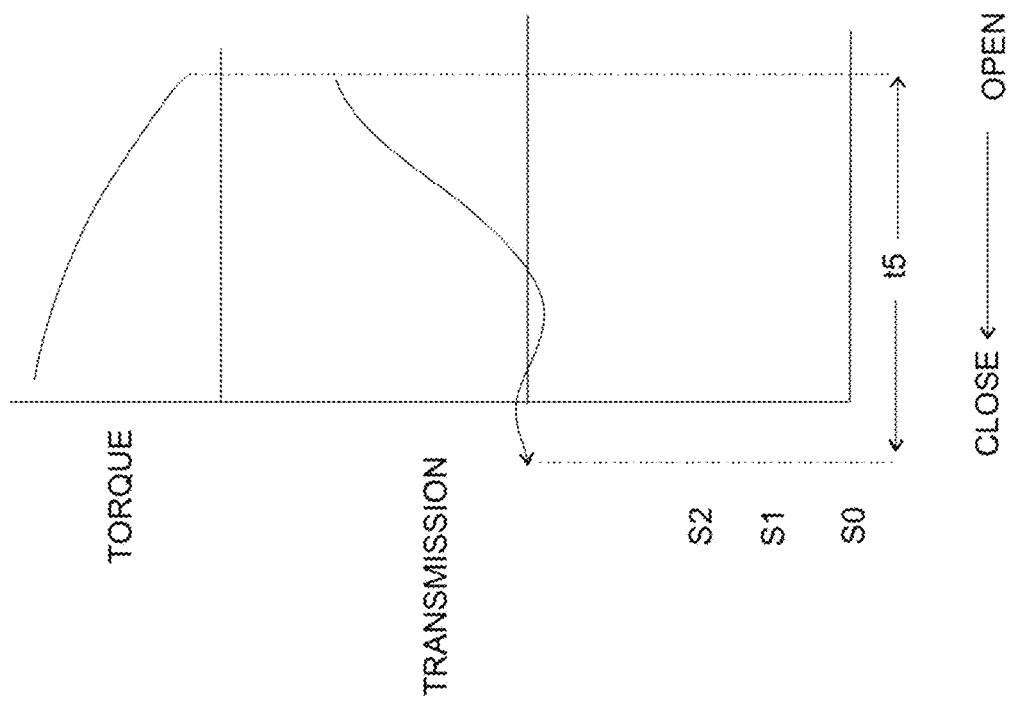

SHUTTER FOR LASER MODULATION

FIELD OF THE INVENTION

The present disclosure relates generally to shutter apparatus and more particularly relates to apparatus and methods for modulating an actinic laser beam with automatic closure on loss of power.

BACKGROUND OF THE INVENTION

High power gas and semiconductor lasers are used in numerous applications to provide high energy illumination at narrow wavelengths. Various types of actinic lasers direct light energy for material processing or to illuminate objects.

The high intensity light output that is generated for actinic applications presents potential hazards to those nearby and must be carefully controlled. For this purpose, various types of mechanical shutters have been devised, serving to provide power modulation and operator safety.

Among design considerations for shutter deployment are speed, suitable redirection of the high-intensity energy when blocking the light path, and behavior upon fault conditions, such as power loss, interlock sensing, or other condition indicating a potential hazard. Additional aspects of interest for shutter design are accuracy of sensing shutter position, as well as size, cost, ageing factors, and number of actuations and consequent lifetime.

Various solutions proposed in the art have addressed these shutter design considerations with some measure of success. One set of shutter solutions, typified in the disclosure of U.S. Pat. No. 4,946,256, entitled "Right Angle Shutter for Laser Beam" to Woodruff, employs a thin, flexible ferromagnetic beam element with an attached tab that covers an aperture when in closed position. To open the path through the aperture, an electromagnet bends the flexible beam to urge the tab away from a blocking position in front of the aperture and permit a laser beam to pass through the shutter aperture. Loss of power de-energizes the electromagnet, releasing the flexible arm to retract to a blocking position. In the closed position, the tab redirects laser energy to a beam trap, which absorbs and dissipates the light energy into the base of the shutter frame.

In another approach, shown, for example, in U.S. Pat. No. 4,332,450, entitled "Magnetic Actuation Methods and Apparatus" issued to Griffith, two magnets operate on each other to magnetically detent a paddle that selectively opens the aperture using a magnetic coil. The magnets drive the blade into the closed position, resting against a stop. An electromagnet operates against the magnetic detent force from the two magnets to open the blade. On loss of power, the two magnets work against each other to force the blade into the closed position against the stop. The blade does not redirect the beam energy but absorbs laser energy directly.

Stepper motors can alternately be used, with or without magnets, to drive the shutter blade between open and closed positions. U.S. Pat. No. 6,046,519 entitled "Stepping Motor" to Hanazumi et al. describes conventional "tin can" stepper motor shutters used for shutter actuation. U.S. Pat. No. 5,691,583 entitled "Stepping Motor with Internal Power Connections" to Suzuki et al. describes an alternate stepper motor structure used for this purpose. Commonly assigned U.S. Pat. No. 9,281,733 entitled "Shutter with Bistable Actuator Having Power-Free Magnetic Blade Return" to Stephenson discloses the use of a bistable rotary solenoid with mechanical configuration to use the solenoid itself to continuously drive a blade to the closed position. Stephenson in commonly assigned U.S. Pat. No. 8,851,768 entitled "Shutter with Power-Free Blade Return" discloses an external magnet on the surface of the bistable rotary solenoid that continuously urges the blade to the closed position.

While existing solutions have provided some advances in shutter capability and performance, there remains some room for improvement. One problem that affects shutter lifetime and performance with ageing relates the use of mechanical stops. Repeated impact or actuation of mechanical damping devices introduces problems of wear due to impact damage. For some designs, these problems can significantly limit effectiveness and compromise shutter performance. Another problem relates to shutter position sensing. Accurate position sensing can help to improve overall utility of the shutter device as well as providing additional capabilities that support fail-safe operation.

Thus, it can be appreciated that there is a need to address problems that constrain shutter performance and reduce effective lifetime of laser shutter devices.

SUMMARY OF THE INVENTION

It is an object of the present disclosure to advance the art of optical shutter design. Embodiments of the present disclosure provide a shutter apparatus that eliminates mechanical impact for shutter movement position and that can further provide electronic braking of rotational movement to improve shutter stability and performance.

According to an aspect of the present disclosure, there is provided an optical shutter apparatus for controllably blocking an aperture, the shutter apparatus comprising:
  a) a rotary actuator configured to rotate a shaft about an axis from a closed-shutter angular position toward an open-shutter angular position;
  b) a shutter blade coupled to the shaft and extending along a plane that is in parallel with the axis of rotation, wherein a surface of the shutter blade is reflective;
  c) a ferromagnetic collar coupled to the shaft and having a protruding portion extending orthogonally from the shaft with respect to the axis; and
  d) a stationary magnet disposed to attract the protruding portion of the collar and urge the shaft toward the closed-shutter angular position.

These objects are given only by way of illustrative example, and such objects may be exemplary of one or more embodiments of the disclosure. Other desirable objectives and advantages inherently achieved by the disclosed disclosure may occur or become apparent to those skilled in the art. The invention is defined by the appended claims.

BRIEF DESCRIPTION OF THE DRAWINGS

The foregoing and other objects, features, and advantages of the disclosure will be apparent from the following more particular description of the embodiments of the disclosure, as illustrated in the accompanying drawings. The elements of the drawings are not necessarily to scale relative to each other.

FIG. 7C is a plot of motion in the event of power loss while in the open position.

DETAILED DESCRIPTION OF THE INVENTION

Figure 1:
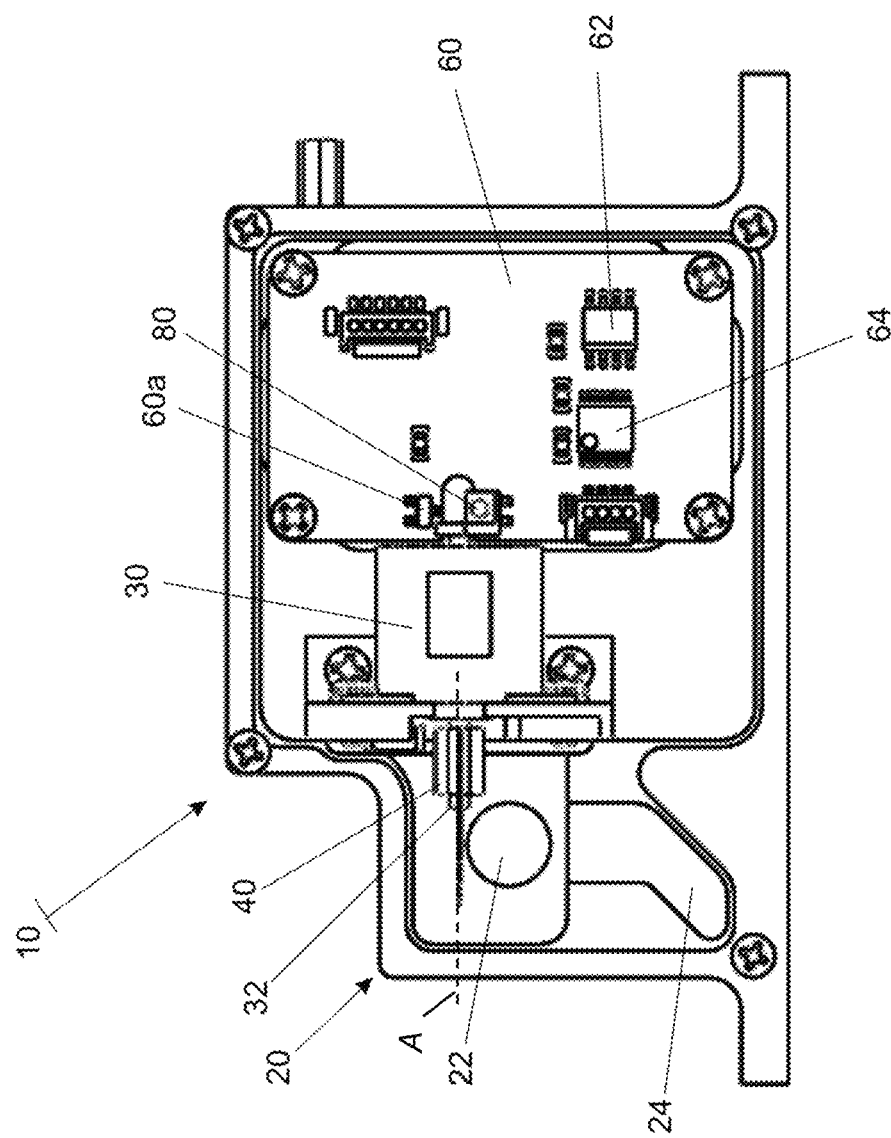
FIG. 1 is a front view of the shutter in accordance with an embodiment of the present disclosure.

Figures provided herein are given in order to illustrate principles of operation and component relationships according to the present disclosure and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces, sides, or views of an assembly or structure and do not describe any necessary orientation of the assembly in an optical or electromechanical apparatus.

In the context of the present disclosure, the term "coupled" is intended to indicate a mechanical association, connection, relation, or linking between two or more components, such that the disposition of one component affects the spatial disposition of a component to which it is coupled. For mechanical coupling, two components need not be in direct contact, but can be linked through one or more intermediary components.

In the context of the present disclosure, a surface considered to "reflect" or to be reflective at a certain wavelength reflects at least 90% of incident light of that wavelength.

Non-magnetic materials are materials that are negligibly affected by magnetic fields and that exhibit no perceptible magnetic attraction and are thus not pulled toward a magnet. In general, non-magnetic materials have a low relative magnetic permeability, typically not exceeding 1.0 at room temperature. Some exemplary non-magnetic materials include copper, aluminum, standard stainless steel, and most metals and alloys; sapphire; various ceramics; wood and paper composite materials; glass; water; plastics and other polymers; fiberglass; and various composite materials such as phenolic materials. By comparison, magnetic materials have higher relative permeability and are considered to be "magnetically responsive", exhibiting magnetic attraction that can be readily perceived without requiring instrumentation; this includes ferromagnetic materials and various compounds of rare earth materials, for example.

There are two general classes of ferromagnetic materials. Permanent magnets are made from "hard" ferromagnetic materials such as alnico and ferrite that are subjected to special processing in a powerful magnetic field during manufacture, to align their internal microcrystalline structure to provide a magnetic flux field. Magnetically "soft" materials like annealed iron, on the other hand, can be magnetized for a period of time, but do not tend to stay magnetized. To demagnetize a saturated magnet, a magnetic field of a given threshold must be applied, and this threshold depends on coercivity of the respective material. "Hard" materials have high coercivity, whereas "soft" materials have low coercivity.

Stepper motors using permanent magnets have a detent torque, also termed a remnant position-holding torque, a "no-current" torque, or cogging torque. This detent torque is due to the interaction between the permanent magnets of the rotor and the stator internal to the motor. Detent torque is position-dependent, with a periodicity per revolution that is based on the number of magnetic poles and number of teeth on the stator.

The inherent detent torque of the stepper motor provides a small amount of holding power when the stepper motor is de-energized. When power is removed, the stepper motor shaft preferentially settles in a position where features on stator and rotor poles exhibit maximum magnetic attraction. The electrical energy that is needed for motor actuation must overcome this detent torque in order to pivot the shutter blade between positions. In some types of stepper motor shutters, power is reduced but not removed when the shutter is in a given position. Reduction of power, such as to half the level needed for shutter actuation, provides a holding torque that exceeds the inherent detent torque and reduces the likelihood of shutter blade movement due to shock, vibration, gravity, or other causes.

Stepper motor-driven shutters are advantaged over solenoid types in that shutter motion can be controlled in incremental steps to eliminate shock from impact when the shutter blade is rapidly moving between positions. The stepper motor has a rotor that is a permanent magnet having multiple poles or teeth. A set of at least two stators is disposed adjacent to the rotor. The stators have projections that interact with the magnetic poles or teeth on the rotor. Two coils operate on the stators to generate electromagnetic fields in each of the two stator arms. The fields in the stator arms operate on the poles in the rotor to selectively rotate the rotor. The polarity of the two coils can be sequentially changed by reversal of current direction to provide rotation of the stepper motor shaft in either direction.

Embodiments of the present disclosure provide laser shutter solutions that can modulate high laser beams of high energy levels, allowing high performance and speed, effective shutter closing in the event of power loss, and re-direction of laser power to a power dump when the shutter blocks the light aperture. In addition, the disclosed embodiments also address some of the known shortcomings of conventional laser shutter solutions, as noted previously in the background section, providing the following:

(i) elimination of mechanical stops and impact damage;

(ii) redundant sensing of shutter position; and (iii) electronic braking of shutter travel.

A shutter designed according to the present disclosure can be capable of operating reliably for tens of millions of cycles.

FIG. 1 is a front view of shutter components, with cover removed, in accordance with an embodiment of the present disclosure. A shutter apparatus 10 is mounted in a frame or housing 20. A cover, not shown, covers the front of shutter apparatus 10 to protect internal components and capture absorbed laser energy when blocking laser light in a closed-shutter position. Housing 20 has an aperture 22 that is oriented in the path of a high-power laser beam. A beam dump 24 within housing 20 receives a deflected laser beam and absorbs the power into housing 20. Housing 20 is preferably metal such as aluminum to absorb and transmit the laser beam energy according to shutter blade position.

A stepper motor or other type of rotational actuator 30 is coupled to housing 20. Brushless motors that are electronically commutated are preferred because there is no mechanical wear from mechanical commutation. The stepper motor can be a standard tin-can stacked stepper motor of conventional design such as a Portescap 15M020D Stepper Motor (Portescap Inc., WestChester, Pa.). Alternatively, the stepper motor of actuator 30 can be a multi-phase brushless motor that is electronically commutated. The rotational actuator 30, such as a stepper motor, has a motor shaft 32 with a rotational axis A. A shutter blade 40 is coupled to shaft 32. Blade 40 has a polished, reflective surface, having a coating, composition, or other treatment that reflects the incident laser beam. The coating on blade 40 can be a rhodium over silver plating, a gold plating, or a coating formed from vacuum-deposited dielectric layers. Blade 40 is planar, with the plane of blade 40 parallel to shaft axis A, typically shaft axis A and blade 40 lie within the same plane. Blade 40 can be bonded to stepper motor shaft 32 using an adhesive compound, such as Loctite™ 648 (Loctite Inc., Dusseldorf, Del.). Alternatively, blade 40 can be fitted, welded, or brazed onto stepper motor shaft 32 using conventional coupling processes.

Shutter Actuation

Figure 2:
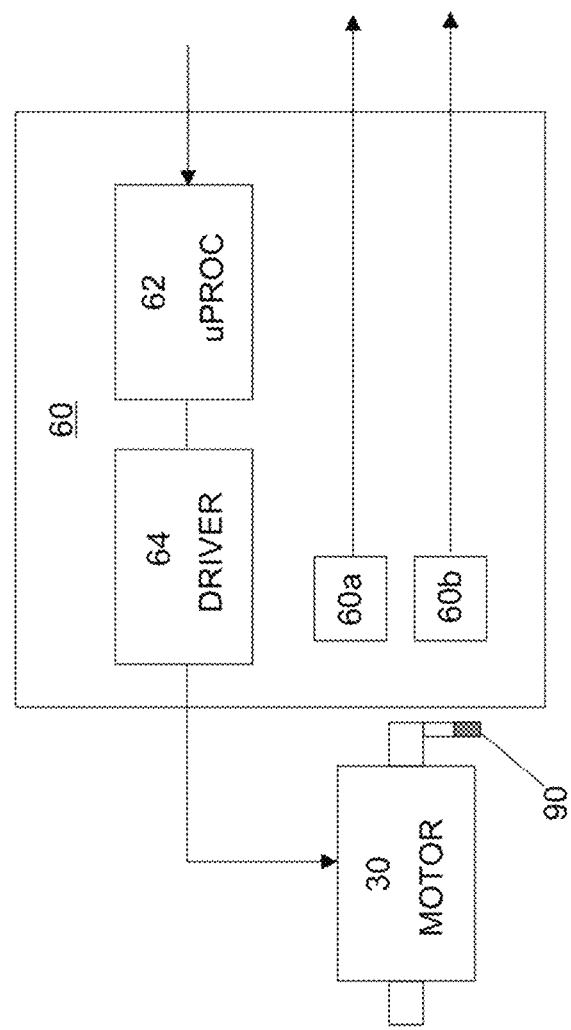
FIG. 2 is a schematic of the electrical circuit of the present disclosure.

FIG. 2 is a schematic diagram that shows electrical circuitry for driving and controlling shutter actuation. The stepper motor that provides actuator 30 is electrically energizable, connected to a circuit board 60 through wires, not shown. Actuator 30 is driven by a driver 64 which is connected to a microprocessor or other control logic processor 62. Control logic processor 62 can be an Atmel™ ATTiny12A microprocessor or equivalent (Atmel Corp., San Jose, Calif.). Driver 64 can be an ON™ Semiconductor 8405C (ON Semiconductor, Phoenix, Ariz.). Control logic processor 62 responds to external commands, such as from a microprocessor or other logic processor that controls overall system operation, to control blade 40 movement. Circuit board 60 also has magnetic sensors 60a and 60b. Magnetic sensors 60a and 60b are responsive to a magnet that is coupled to the shaft of actuator 30, as described in more detail subsequently.

Figure 3:
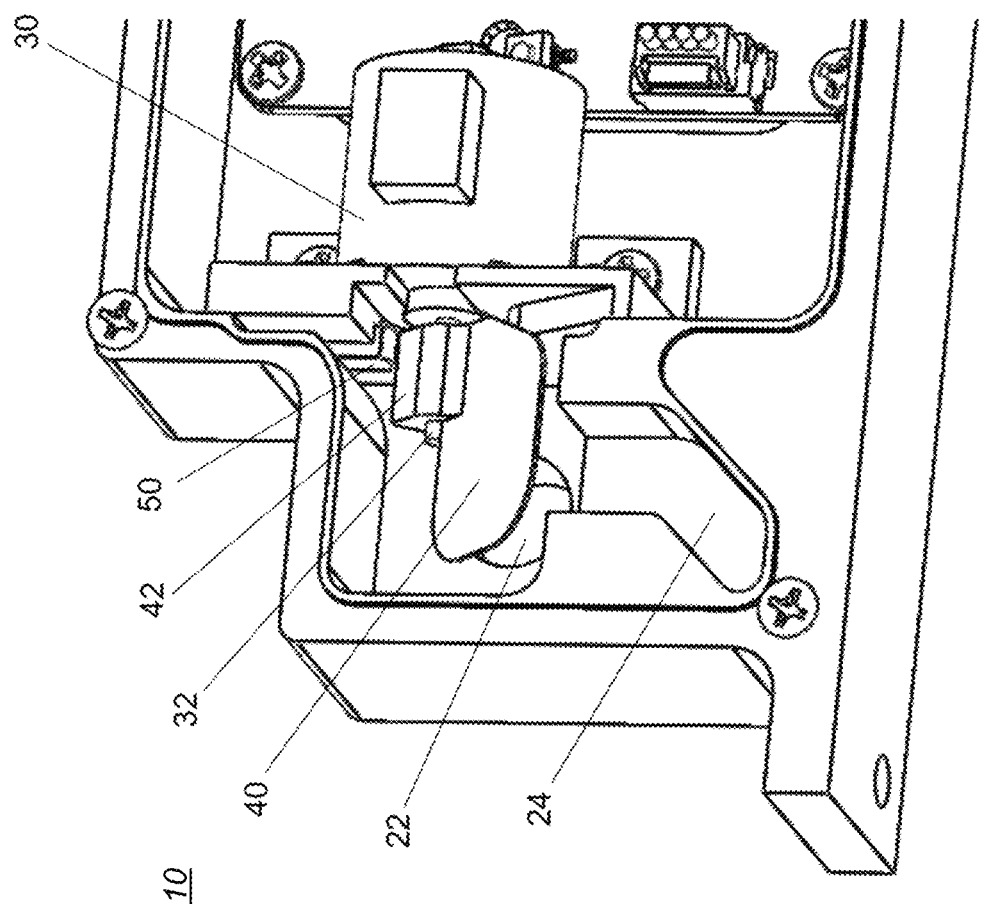
FIG. 3 is an isometric view of the shutter showing the blade and detent area in the present disclosure.
Figure 4:
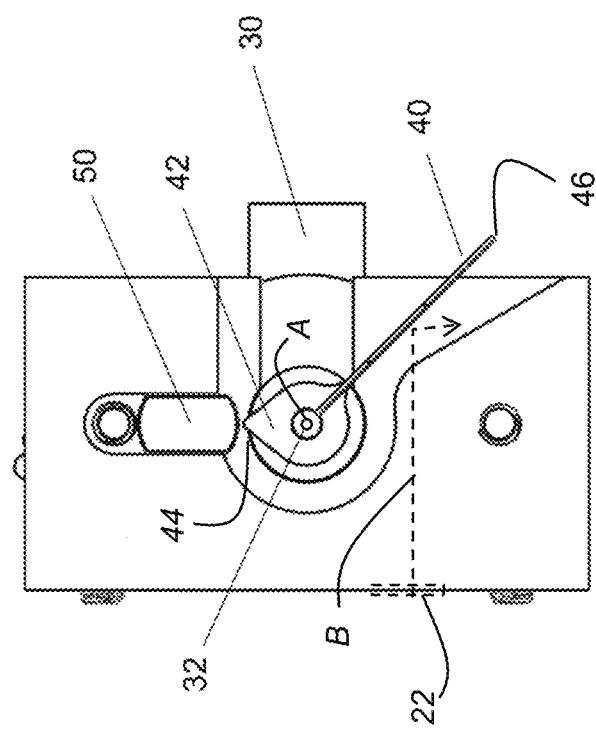
FIG. 4 is a front view of the detent mechanism according to an embodiment of the present disclosure.

FIG. 3 is an isometric view of the shutter apparatus 10 showing the blade 40 and magnetic detent area according to an embodiment of the present disclosure. FIG. 4 is a front view of the detent mechanism according to an embodiment. In this view, blade 40 is in closed-shutter angular position, a blocking state in which blade 40 deflects a laser beam entering through aperture 22, as indicated by the dashed line. The closed-shutter position shown in FIG. 4 also corresponds to the unpowered state. According to an embodiment, a ferromagnetic collar 42 is coupled to shaft 32 and cooperates with a detent magnet 50, such as a permanent magnet. Magnet 50 uses magnetic force to hold blade 40 in a deflecting, closed-shutter position when shutter apparatus 10 is deactivated or otherwise in the unpowered state. Collar 42 can be part of blade 40 or can be spaced apart from, and aligned with, blade 40.

Collar 42 is asymmetrical with respect to shaft 32 with a protruding portion 44 that extends outward in a direction orthogonal to axis A. Protruding portion 44 can be a protrusion, tongue, bulge, or other feature extending outward with respect to the shaft 32, for example, Stationary detent magnet 50 exerts force continuously towards portion 44 as blade 40 is moved between the open and closed positions or states. Upon loss of power, protruding portion 44 is attracted to magnet 50, and there is no countering resistance from actuator 30, so that shaft 32 rotates to the position shown in FIG. 4 and blade 40 is correspondingly forced toward the closed position, as shown.

Magnetic closure as just described with reference to FIG. 4 is advantaged over spring or flexure force, eliminating mechanical wear factors for positioning shutter blade 40 in order to block aperture 22. Edges 46 of blade 40 continually float in free space, whether the shutter blade 40 is moving between positions or stationary. Alternatively, a conventional spring can provide an urging force for forcing blade 40 return to the blocking or closed-shutter position.

The base material for blade 40 is ferromagnetic in the embodiment shown, in order to enhance magnetic attraction toward magnet 50. Ferromagnetic materials for blade 40 can be low-carbon steels or 400-series ferromagnetic stainless steels. In the deflecting position, a laser beam B entering aperture 22 is reflected into beam dump 24 (FIG. 3) by the reflective coating on blade 40. Housing 20 absorbs reflected radiation and transmits the resulting thermal energy through housing 20 to a supporting heat dissipation surface or heat sink (not shown).

Position Sensing

Figure 5:
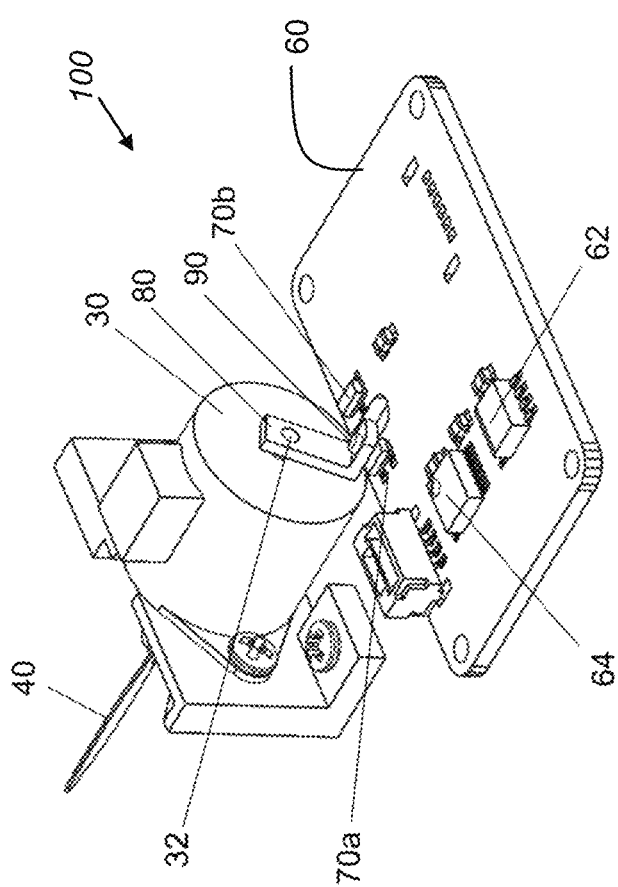
FIG. 5 is an isometric view of blade position sensing in accordance with the present disclosure.

FIG. 5 is an isometric view of blade 40 position-sensing components of a blade position sensing apparatus 100 according to an embodiment of the present disclosure. Motor shaft 32 extends through stepper motor or other actuator 30 and projects from both ends of actuator 30. The sensing side of motor shaft 32, as visible from the view of FIG. 5, has an attached sensor arm 80 that is coupled to shaft 32 at a fixed angle relative to the planar orientation angle of blade 40. Sensor arm 80 holds a sensing magnet 90. With this arrangement, a movable sensing magnet 90 swings into position along with shutter blade 40 as the blade moves between closed-shutter and open-shutter angular positions for corresponding blocking or transmitting states. Hall-effect sensors 70a and 70b are arranged on circuit board 60, disposed at appropriate positions to be triggered separately according to magnet 90 movement as blade 40 moves to the two positions. This redundant arrangement permits independent detection of blade 40 at two separate angular positions of motor shaft 32.

Figure 6:
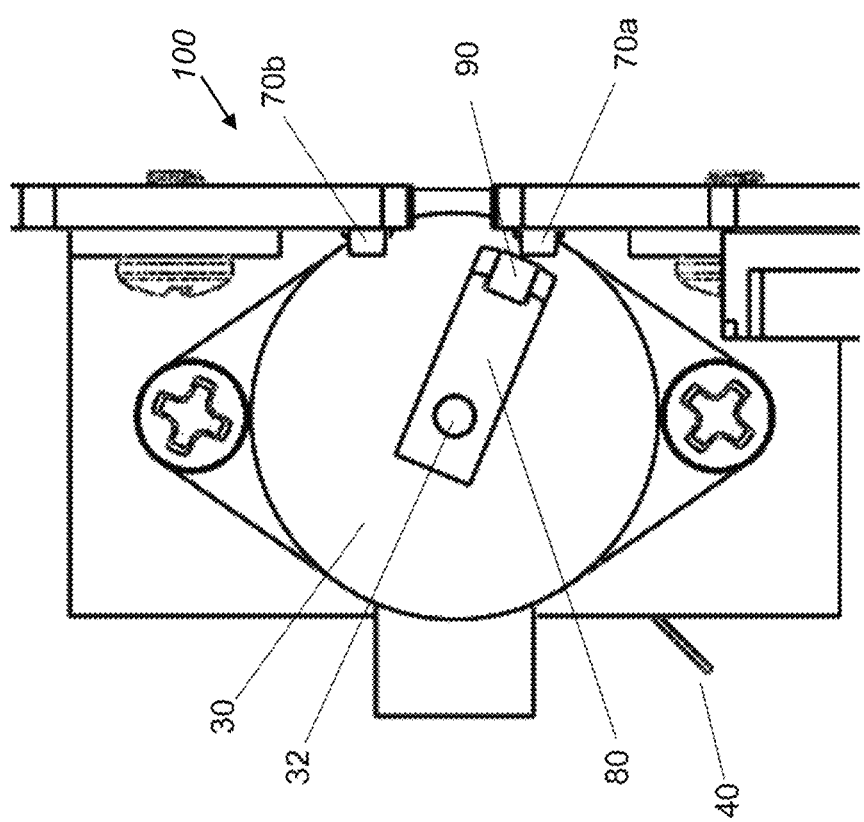
FIG. 6 is a rear view of the blade sensing apparatus in accordance with the present disclosure.

FIG. 6 is a rear view of blade sensing apparatus 100 according to an embodiment of the present disclosure. When blade 40 is in the closed-shutter angular position, deflecting the incident laser beam from transmission in its blocking state, magnet 90 is brought into close proximity to Hall effect sensor 70a to indicate that the shutter is in position for deflecting a laser beam. When blade 40 is rotated into the alternate open-shutter angular position as shaft 32 rotates, moving arm 80 and its attached magnet 90 move so that magnet sensor 70a is deactivated and the alternate Hall sensor 70b detects the magnet in proximity, sensing that shutter apparatus 10 is in its transmitting state.

The Hall-effect sensor is triggered by low levels of magnetic field. A suitable Hall effect sensor for shutter apparatus 10 can be Silicon Labs™ SI7201-B-04-IV (Silicon Laboratories, Inc., Austin, Tex.) which switches omnidirectionally at a magnetic field of less than 1.1 milli-Teslas. The displacement of magnet 90, the size of the magnet, and type of sensor permit independent sensing by two Hall-effect devices at different angular locations with respect to movement of arm 80.

The sensing apparatus could alternately consist of other types of non-contact sensor. An optical blocking version of sensor arm 80 can be used with a corresponding flag element to interrupt light independently to each of two optical sensors. In addition to Hall-effect sensors, other types of non-contact magnetic sensors can include magnetorestrictive sensors and reed switch sensors. Magnetic detection has advantages due to relative insensitivity to foreign object debris (FOD). Locating the sensing components on the opposite side of shaft 32 from blade 40 advantageously separates the electronic sensing from the heat and movement associated with blade 40.

Motion Control with Electronic Braking

The ideal shutter transitions rapidly between states, from fully open position to fully closed position. In order to approximate near-ideal behavior with respect to transition time, conventional shutter designs typically use mechanical stops to delimit the range of shutter movement, so that shutter operation is very fast, with only very slight transition time needed to reverse shutter position from fully open to fully closed. Although the use of mechanical stops can help to reduce switching time between shutter states, the use of mechanical stops introduces problems of parts wear and damage to shutter components, effectively limiting the useful lifetime of the shutter.

In order to provide both very fast shutter response and extended shutter lifetime, an embodiment of the present disclosure provides a combination of electronic and magnetic braking that eliminates the need for mechanical stops, so that there is no obstructive mechanical contact at either endpoint in the shutter motion path. Blade 40 is coupled only to shaft 32. The edges of blade 40 float in free space and make no contact with any obstructing surface.

Figure 7A:
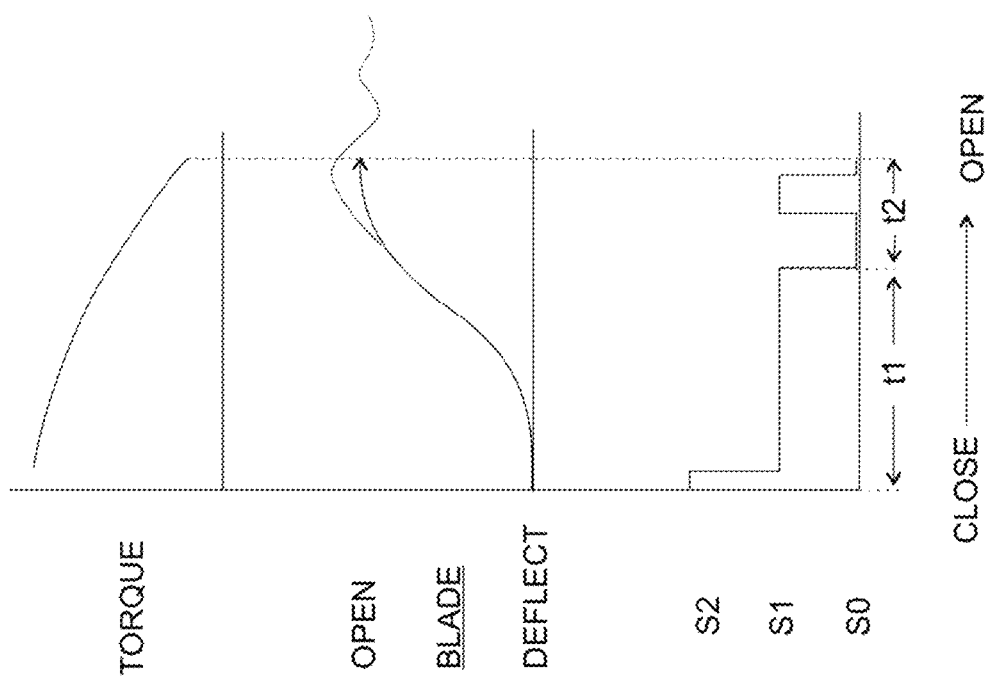
FIG. 7A is a plot of motion control for opening the shutter.

The timing diagram of FIG. 7A shows signal states used for motion control in moving the shutter blade 40 from an initial closed-shutter angular position shown as DEFLECT state to the open-shutter angular position shown as OPEN state. The default position for blade 40, such as at initialization, is in DEFLECT state, in the closed-shutter angular position, held in deflecting position by magnet 50, as described previously. Shutter blade 40 blocks the aperture in the closed-shutter DEFLECT angular position and redirects incident light to beam dump 24 in this default position, as also described previously.

Upon command from an external signal, control logic processor 62 (FIG. 2) activates driver 64 to apply corresponding signals for drive states in sequential steps in order to open the shutter. Actuator 30, a stepper motor in an embodiment, can be a conventional tin-can stacked stepper motor with a predetermined step angle, with each sequential angle corresponding to a step. In an embodiment using a 20-degree step angle, two steps are required to open the shutter 40 degrees.

Figure 7B:
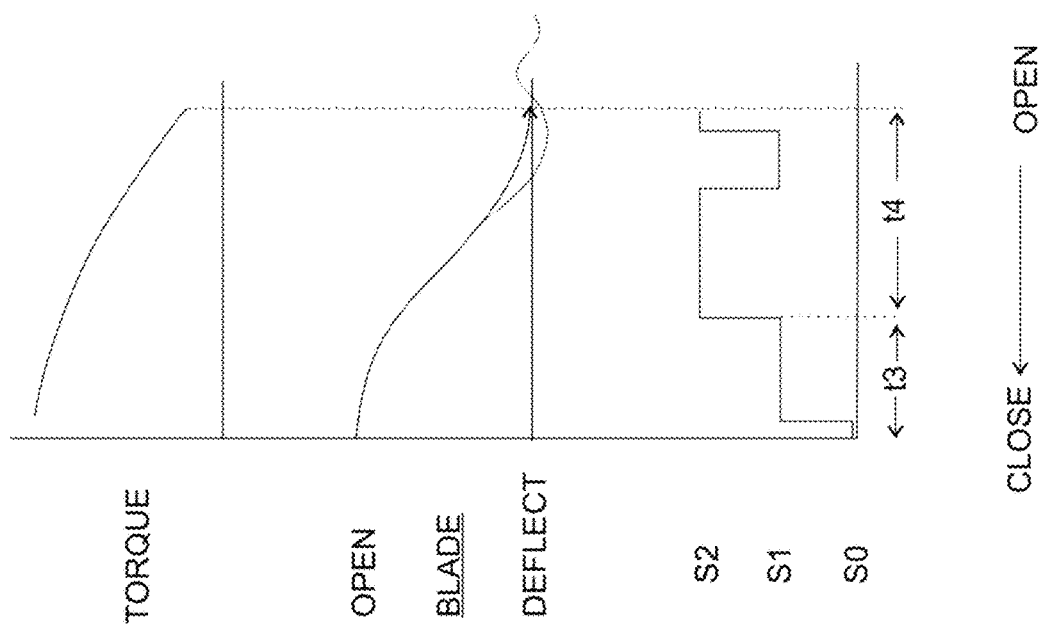
FIG. 7B is a plot of motion control for closing the shutter.

In FIGS. 7A, 7B, and 7C, discrete drive states S0, S1 and S2 are used to move shaft 32 and to effect consequent blade 40 movement. State S2 corresponds to the DEFLECT state of the stepper motor, positioning shaft 32 and blade 40 in the closed-shutter DEFLECT position. State S0 corresponds to the stepper motor signal to position shaft 32 and blade 40 to the open-shutter OPEN angular position. State S1 corresponds to an INTERMEDIATE state, a stepper motor drive state that positions shaft 32 and blade 40 in an intermediate stepper motor shaft 32 position.

Electronic control and braking of blade 40 movement uses a sequence of states S0, S1, and S2 in order to move between blade 40 positions without overshoot and without the need for mechanical stops.

Referring to FIGS. 2 and 7A, control logic processor 62 commands driver 64 to provide appropriate signals to effect state S1, moving shaft 32 and blade 40 from the open-shutter DEFLECT angular position to an intermediate angular position. Application of state S1 over a time interval t1 moves blade 40 from the initial closed-shutter DEFLECT angular position toward an intermediate position, between blocking and transmission. After time interval t1, blade 40 has moved over a portion of its travel toward the OPEN position. Over time interval t2, control logic processor 62 then commands driver 64 to apply signals for state S0 to continue movement urging shutter blade 40 to the OPEN position. A momentary return to state S1 at the end of travel brakes the motion of shutter blade 40 so that shutter blade 40 comes to a controlled stop at the OPEN position without appreciable overtravel or bounce.

For the movement sequence shown in FIG. 7A, the closing TORQUE value is initially high, dropping steadily as blade 40 moves toward the OPEN position. The values of time intervals t1 and t2 are selected to rotate blade 40 between states, from the closed-shutter DEFLECT angular position to the open-shutter OPEN angular position, achieving close to zero speed as blade 40 nears the final open-shutter OPEN angular position.

As shown in the sequence of FIG. 7A, the motion characteristic of blade 40 over time can follow a classic "S-curve" with a high acceleration during the first half of motion followed by energy removal in the second half of travel, with relatively low final velocity at the end of interval t2.

To maintain blade 40 in the open-shutter OPEN angular position, control logic processor 62 holds blade 40 against closing TORQUE by maintaining power with state S0 through driver 64. Because the closing TORQUE is lower, processor 62 can control a suitable On/Off duty cycle on driver 64 to maintain blade 40 in the open-shutter OPEN angular position. This is possible where driver 64 has the capability to rapidly switch drive states.

The timing diagram of FIG. 7B shows motion control signals for controllably restoring shutter blade 40 to the closed-shutter DEFLECT angular position. The use of motion control signals over intervals t3 and t4 reduces overshoot and oscillation in the reverse direction, thereby providing a shortened cycle for blade 40 return to the closed-shutter DEFLECT angular position. According to an embodiment of the present disclosure, drive power is applied in order to move blade 40 from the open-shutter OPEN angular position to the closed-shutter CLOSE angular position. Time intervals t3 and t4 are selected for applying braking torque against the closing force from magnet 50 that reduces blade 40 velocity as it nears the closed-shutter DEFLECT angular position. Here again, the motion imparted to shaft 32 and its corresponding blade 40 can follow an "S-curve" characteristic. Near the end of the motion sequence, the drive state is returned to intermediate position S1 to brake the speed of shutter blade 40. At or near the end of travel, power can be removed completely so that magnetic detent arrests blade 40 travel and holds blade 40 fixedly in closed-shutter DEFLECT angular position.

The timing diagram of FIG. 7C shows state behavior for motion of shaft 32 and blade 40 in the event of power loss, where the power loss occurs with blade 40 in the open-shutter OPEN angular position, transmitting light through the aperture. No signals are needed for state transition. Loss of power in this case causes closing TORQUE from magnet 50 to drive blade 40 to the closed-shutter CLOSE angular position. Because the stepper motor is de-energized, there is no controlled motion on closing. Blade 40 moves rapidly to the CLOSE position. There can be slight overshoot and oscillation for a few cycles until blade 40 comes to a full stop in its resting position. Oscillation is shown over time interval t5. It should be noted that time interval t5 can have a duration that exceeds the sum of time intervals t3 and t4 that provide controlled closing action in FIG. 7B.

It can be appreciated that the timing descriptions given with respect to FIGS. 7A-7C are somewhat simplified. However, the basic mechanisms described provide useful sequences for controlled change of shutter state without excessive overshoot or oscillation and without the need for mechanical stops or mechanical impact of the shutter mechanism.

According to an embodiment of the present disclosure, the duty cycle between each stepper motor state can be modulated between states to create a smooth magnetic wave for braking of blade 40 switching. A semiconductor driver 64 in an embodiment can have the capacity to switch between OPEN and CLOSE states rapidly in order to permit dithered intermediate steps between steps S0, S1 and S2.

The invention has been described in detail with particular reference to a presently preferred embodiment, but it can be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. An optical shutter apparatus for controllably blocking an aperture, the shutter apparatus comprising:
    a) a rotary actuator configured to rotate a shaft about an axis from a closed-shutter angular position toward an open-shutter angular position;
    b) a shutter blade coupled to the shaft and extending along a plane that is in parallel with the axis of rotation, wherein a surface of the shutter blade is reflective;
    c) a ferromagnetic collar coupled to the shaft and having a protruding portion extending orthogonally from the shaft with respect to the axis; and
    d) a stationary magnet disposed to attract the protruding portion of the collar and urge the shaft toward the closed-shutter angular position.

2. The apparatus of claim 1 wherein the actuator is coupled to a housing.

3. The apparatus of claim 2 wherein edges of the shutter blade float in free space at both closed-shutter and open-shutter angular positions.

4. The apparatus of claim 1 wherein the actuator is an electronically commutated motor.

5. The apparatus of claim 1 further comprising a first shaft position sensor and a second shaft position sensor, each providing a signal according to an angular position of the shaft.

6. The apparatus of claim 5 wherein one or both shaft position sensors are magnetic sensors.

7. The apparatus of claim 5 wherein one or both shaft position sensors are optical sensors.

8. The apparatus of claim 1 further comprising a movable magnet coupled to the shaft and one or more Hall-effect sensors responsive to magnet position.

9. The apparatus of claim 1 wherein the actuator is a stepper motor and further comprising a control logic processor that provides signals for controlled movement and braking of the stepper motor.

10. An optical shutter apparatus for controllably blocking an aperture, the shutter apparatus comprising:
    a) a stepper motor coupled to a housing and configured to rotate a shaft about an axis from a closed-shutter angular position toward an open-shutter angular position;
    b) a shutter blade coupled to the shaft and extending along a plane that is in parallel with the axis of rotation;
    c) a ferromagnetic collar coupled to the shaft and having a protruding portion extending orthogonally from the shaft with respect to the axis;
    d) a stationary magnet disposed to attract the protruding portion of the collar and urge the shaft toward the closed-shutter angular position;
    e) a control logic processor that provides signals for controlled movement and braking of the stepper motor; and
    f) a first shaft position sensor and a second shaft position sensor, each providing a signal according to an angular position of the shaft.

11. The apparatus of claim 10 wherein the first and second shaft position sensors are Hall-effect sensors.

12. The apparatus of claim 10 wherein the first and second shaft position sensors are non-contact optical sensors.

13. The apparatus of claim 10 wherein edges of the shutter blade float in free space at both closed-shutter and open-shutter angular positions.

14. A method for controlling light transmission through an optical aperture comprising:
    a) mounting a rotary actuator to a housing having the optical aperture;
    b) configuring the rotary actuator to rotate a shaft about an axis to a closed-shutter angular position in response to a first signal state and to an open-shutter angular position in response to a second signal state;
    c) coupling a shutter blade to the shaft, wherein the shutter blade surface extends along a plane that is in parallel with the axis of rotation;
    d) coupling a ferromagnetic collar to the shaft, the collar having a protruding portion extending orthogonally from the shaft with respect to the axis; and
    e) mounting a stationary magnet to the housing, the stationary magnet disposed to attract the protruding portion of the collar and urge the shaft toward the closed-shutter angular position and the shutter blade over the optical aperture.

15. The method of claim 14 wherein shutter blade edges float in free space in the closed-shutter angular position and in the open-shutter angular position and further float in free space when between the closed-shutter and open-shutter angular positions.

16. The method of claim 14 further comprising configuring the rotary actuator, in response to a third signal state, to rotate the shaft to an intermediate position between the closed-shutter and open-shutter angular positions.

17. The method of claim 14 further comprising sensing and reporting shutter blade shaft position using one or more Hall-effect sensors to detect proximity of a movable magnet that is coupled to the shaft.

\* \* \* \* \*